United States Patent [19]

Rossillo

[11] Patent Number: 5,361,393

[45] Date of Patent: Nov. 1, 1994

[54] METHOD FOR IMPROVING INTERACTIVE-SCREEN UPLOADING OF ACCOUNTING DATA

[75] Inventor: Michael Rossillo, Brewster, N.Y.

[73] Assignee: Prodigy Services Company, White Plains

[21] Appl. No.: 827,072

[22] Filed: Jan. 28, 1992

[51] Int. Cl.$^5$ .................................... G06F 15/21
[52] U.S. Cl. ........................ 395/650; 364/DIG. 2; 364/931.4; 364/933.9; 364/975.1
[58] Field of Search ............... 364/DIG. 1, DIG. 2; 395/650, 700

[56] References Cited

U.S. PATENT DOCUMENTS

| | | | |
|---|---|---|---|
| 4,204,206 | 5/1980 | Bakula et al. | 364/DIG. 2 |
| 4,641,262 | 2/1987 | Bryan et al. | 364/DIG. 2 |
| 5,058,000 | 10/1991 | Cox et al. | 364/DIG. 1 |

Primary Examiner—Thomas M. Heckler
Attorney, Agent, or Firm—Paul C. Scifo

[57] ABSTRACT

Method for improving the process of uploading data from a terminal computer to a host computer with interactive, data receiving screens. The method features use of spreadsheet software to format data to be uploaded in a data source file. The data to be uploaded is laid out in single-row, multi-column form within the spreadsheet so that vivid, hard copy journals of the data may be created that facilitate examination of the data and memorializes its existence. Additionally, the data layout may be transformed and provided with additional information using the spreadsheet to create the data source file having a single-column, multi-row format suitable to facilitate entry of the data to the interactive screens for uploading. Additionally, the method features use of a management program that includes instruction for directing and coordinating the feeding of the data contained the source file to an interface program that enters the data in the predetermined fields of the interactive screens.

15 Claims, 11 Drawing Sheets

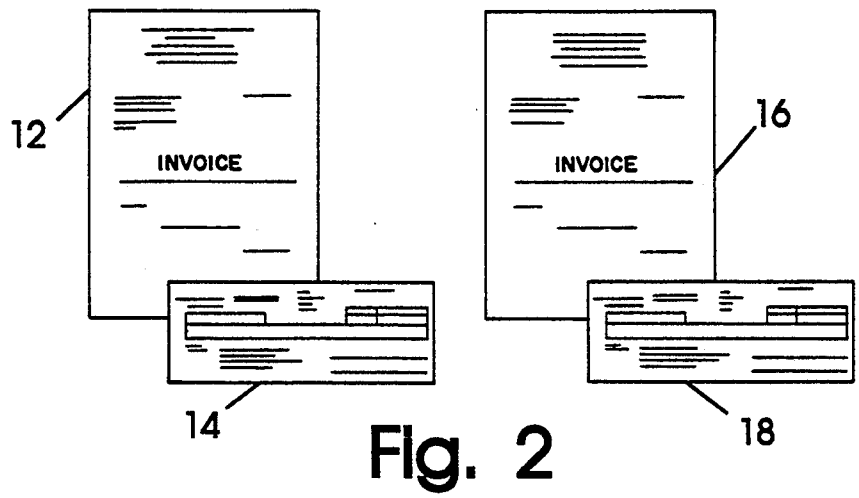

28

| Accounting Date: | 10/31/91 | Journal Entry Type: | C |
| --- | --- | --- | --- |
| Prepared By: | MR | Journal Number: | EA001 |
| Approved By: | MM | Date Prepared: | 11/15/91 |
| Entered By: | SD | Date Entered: | 11/15/91 |
| Control Total: | 1,825.00 | Header: | CASH ADJ |

| Acct # | CTR | D/C | Amount | S/I | Ven # | Description | Alt Description |
| --- | --- | --- | --- | --- | --- | --- | --- |
| 11820 | 1111 | D | 850.00 | A | 970074 | CASH ADJ | C.P. THOMPSON |
| 11720 | 1111 | C | 850.00 | A | 970074 | CASH ADJ | C.P. THOMPSON |
| 60149 | 2000 | D | 975.00 | A | 930765 | CASH ADJ | R.D. MELLON |
| 60149 | 2100 | C | 975.00 | A | 930765 | CASH ADJ | R.D. MELLON |

| | | | |
|---|---|---|---|
| 1 | I | 38 | I |
| 2 | ED | 39 | 97004 |
| 3 | EA001 | 40 | I |
| 4 | CASH ADJ | 41 | CASH ADJ |
| 5 | $$ | 42 | I |
| 6 | C | 43 | C.P. THOMPSON |
| 7 | 10/31/91 | 44 | 60149 |
| 8 | A | 45 | I |
| 9 | MR | 46 | 2000 |
| 10 | G | 47 | I |
| 11 | 1,825.00 | 48 | D |
| 12 | D | 47 | I |
| 13 | 10 | 50 | 975.00 |
| 14 | 11820 | 51 | I |
| 15 | I | 52 | A |
| 16 | 1111 | 53 | I |
| 17 | I | 54 | 930765 |
| 18 | D | 55 | I |
| 19 | I | 56 | CASH ADJ |
| 20 | 850.00 | 57 | I |
| 21 | I | 58 | R.D. MELLON |
| 22 | A | 59 | 60149 |
| 23 | I | 60 | I |
| 24 | 970074 | 61 | 2100 |
| 25 | I | 62 | I |
| 26 | CASH ADJ | 63 | C |
| 27 | I | 64 | I |
| 28 | C.P. THOMPSON | 65 | 975.00 |
| 29 | 11720 | 66 | I |
| 30 | I | 67 | A |
| 31 | 1111 | 68 | I |
| 32 | I | 69 | 930765 |
| 33 | C | 70 | I |
| 34 | I | 71 | CASH ADJ |
| 35 | 850.00 | 72 | I |
| 36 | I | 73 | R.D. MELLON |
| 37 | A | 74 | LASTLINE |

```
GUH     100 EA001                              ON GLJDR
                                        LEVEL 01 LINK FROM GLDR
            GL : M  -  JOURNAL ENTRY HEADER
CORP 100
                                                              ──56
                    JOURNAL ID  →    EA001
               JOURNAL DESCRIPTION → CASH ADJ                 ──58
               REAL/STATISTICAL CODE →                        ──60
                  TRANSACTION TYPE →
                    EFFECTIVE DATE →                          ──62
                ERROR HANDLING CODE →                         ──64
                   JOURNAL SOURCE →
                 DEBIT/CREDIT/GROSS →                         ──66
                    CONTROL TOTAL →
                    DELETE OPTION →                           ──68
                    DETAIL INTERVAL →                         ──70
J112W - PRESS ENTER TO OPEN JOURNAL  J114W-TRANSACTION WILL BE EDITED
A205W - END OF LIST                                           ──72
                                                              ──74
SB                         11/15/91 12:14:00 M2LL ACTION ____
                                                       0-001
```

Fig. 10

```
GUH     100 EA001                              ON GLJDR
                                        LEVEL 01 LINK FROM GLDR
            GL : M  -  JOURNAL ENTRY HEADER
CORP 100
                    JOURNAL ID  →    EA001                    ──56
               JOURNAL DESCRIPTION → CASH ADJ                 ──58
               REAL/STATISTICAL CODE → S                      ──60
                  TRANSACTION TYPE → C
                    EFFECTIVE DATE → 10/31/91                 ──62
                ERROR HANDLING CODE → A                       ──64
                   JOURNAL SOURCE → MR
                 DEBIT/CREDIT/GROSS → G                       ──66
                    CONTROL TOTAL → 1,825.00
                    DELETE OPTION → D                         ──68
                    DETAIL INTERVAL → 10                      ──70
J112W - PRESS ENTER TO OPEN JOURNAL  J114W-TRANSACTION WILL BE EDITED
A205W - END OF LIST                                           ──72
SB                         11/15/91 12:15:00 M2LL ACTION ____ ──74
                                                       0-001
```

```
        GUH    100 EA001                              ON GLJDR
              ,116                          LEVEL 01 LINK FROM GLJDR
   OPTION ___/        GL : M - JOURNAL ENTRY DETAIL
      CORP 100       JOURNAL   EA001    DESCRIPTION  CASH ADJ
   HI SEQ  $/#  T E   EFF DATE  D/C/G   CONTROL TOTAL    RUNNING NET
      0    $    C A   10/31/91    G        1,825.00           .00
      SEQ  ACCOUNT  CENTER   D/C   ENTRY AMOUNT  SUB LEDGER  TL  S
                         TRANS DESCRIPTION   ADDITIONAL DESCRIPTION

A287W-NO RECORD/S FOUND        11/15/91  12:16:00 M?LL ACTION ____
   SB                                                           O-001
```

Fig. 13

```
        GUH    100 EA001                              ON GLJDR
              ,116                          LEVEL 01 LINK FROM GLJDR
   OPTION ___/        GL : M - JOURNAL ENTRY DETAIL
      CORP 100       JOURNAL   EA001    DESCRIPTION  CASH ADJ
   HI SEQ  $/#  T E   EFF DATE  D/C/G   CONTROL TOTAL    RUNNING NET
      0    $    C A   10/31/91    G        1,825.00           .00
      SEQ  ACCOUNT  CENTER   D/C   ENTRY AMOUNT  SUB LEDGER  TL  S
                         TRANS DESCRIPTION   ADDITIONAL DESCRIPTION
       1    11820    1111    D      850.00        A   970074
                    CASH ADJ                      C.P. THOMPSON
       1    11720    1111    C      850.00        A   970074
                    CASH ADJ                      C.P. THOMPSON
       1    60149    2000    D      975.00        A   930765
                    CASH ADJ                      R.D. MELLON
       1    60149    2100    C      975.00        A   930765
                    CASH ADJ                      R.D. MELLON
   A287W-NO RECORD/S FOUND        11/15/91  12:17:00 M?LL ACTION ____
   SB                                                           O-001
```

```
       GUH    100 EA001                                    ON  GLJDR
                                              LEVEL 01 LINK FROM GLJDR
  OPTION  Q        GL : M - JOURNAL ENTRY PROVE
  CORP 100         JOURNAL  EA001
   $/#  T/T  EFF DATE   E/H    DESCRIPTION    D/C/G    CONTROL TOTAL
    $    C   10/31/91    A     RECLASS BTA      G         1,825.00
                COUNTS          DEBIT AMOUNTS       CREDIT AMOUNTS
      VALID       4              1,825.00            1,825.00 CR
    IN ERROR      0                  .00                  .00
    WARNING       0                  .00                  .00
  TRANS TOTAL     4              1,825.00            1,825.00 CR
                                 1,825.00            1,825.00 CR
  CNTRL TOTAL
   DIFFERENCE                        .00                  .00
                                     .00                  .00
  ADJ. TO BAL.
  J143I-JOURNAL IS POSTABLE         J133W-JOURNAL WILL SUSPENSE POST
  J134-W SUSP- 100  13599   1111    J132W-JOURNAL CANNOT BE POSTED ONLINE
                                       11/15/91 12:18:00 M2LL ACTION _____
  SB                                                               0-001
```

| | | | |
|---|---|---|---|
| 1 | OPEN (A:\EA001.PRN) (R) | 32 | READ (11) |
| 2 | SAY (@HGUH@F@T100,@F@TGLJDR@E) | 33 | READ (11) |
| 3 | READ (5) | 34 | READ (12) |
| 4 | READ (6) | 35 | READ (12) |
| 5 | READ (7) | 36 | PUT (2) (I) |
| 6 | READ (8) | 37 | REDRAW |
| 7 | SAY (@E@E) | 38 | :ERROR1 |
| 8 | REDRAW | 39 | SAY (@E) |
| 9 | READ (2) | 40 | IMMEDIF (J013F) (22,1) (5) GOTO (ACCOUNT1) |
| 10 | READ (3) | 41 | IMMEDIF (J033F) (22,1) (5) GOTO (SLIDA1) |
| 11 | READ (4) | 42 | IMMEDIF (J032F) (22,1) (5) GOTO (ID1) |
| 12 | READ (5) | 43 | IMMEDIF (LASTLINE) (12,10) (8) GOTO (PR) |
| 13 | READ (6) | 44 | GOTO DISTRIBUTION |
| 14 | READ (7) | 45 | :ACCOUNT1 |
| 15 | READ (8) | 46 | PUT (4) (13597) |
| 16 | READ (9) | 47 | PUT (5) (1111) |
| 17 | READ (10) | 48 | SAY (@E) |
| 18 | SAY (@E@E) | 49 | GOTO (ERROR1) |
| 19 | REDRAW | 50 | :SLIDA1 |
| 20 | :DISTRIBUTION | 51 | PUT (8) (A) |
| 21 | READ (4) | 52 | SAY (@E) |
| 22 | READ (5) | 53 | GOTO (ERROR1) |
| 23 | READ (5) | 54 | :ID1 |
| 24 | READ (6) | 55 | PUT (9) (999998) |
| 25 | READ (6) | 56 | SAY (@E) |
| 26 | READ (7) | 57 | GOTO (ERROR1) |
| 27 | READ (7) | 58 | :PR |
| 28 | READ (8) | 59 | SAY (@K@K@K@K@F@E) |
| 29 | READ (8) | 60 | PUT (1) (PR) |
| 30 | READ (9) | 61 | SAY (@E@E@E) |
| 31 | READ (9) | 62 | :END |

Fig. 16

METHOD FOR IMPROVING INTERACTIVE-SCREEN UPLOADING OF ACCOUNTING DATA

FIELD OF INVENTION

This invention concerns a method for improving the process of uploading accounting data from a terminal computer to a host computer with interactive, data receiving screens. More specifically, the method includes steps for accumulating and formatting the accounting data for subsequent automated feed and entry to the interactive, receiving screens supported at the terminal by the host. The improved method features steps for accumulating and formatting accounting data with spreadsheet software that facilitates generation of vivid, hard copy and digital file copy of the data. Additionally, the method features steps that comprise a management program for directing a linking program to enter the specially formatted data to predetermined fields of the interactive screens that, subsequently, upload the data from the terminal to the host.

BACKGROUND OF THE INVENTION

Accounting requirements in contemporary society are pervasive. The financial sophistication of commercial and private life requires that accounting records of all types be created and maintained. Records of goods and services supplied and received are essential to follow the progress of commerce. Inventory and asset records must be maintained to establish the value of business and private holdings. And, records of income and expense must be created to prepare and file the numerous and varied tax returns compelled by government. It is difficult to imagine how individuals, corporations or other entities could make financial sense of their affairs without the use of accounting data.

Still further, the problem of creating and maintaining this ever increasing amount of financial information is aggravated by the need for absolute accuracy in the records produced. Where money is concerned, not only must the volume of information be handled, but also, its accuracy must be assured to avoid financial loss. Experience has shown a true picture of an entity's financial condition is essential to its successful management and operation.

Faced with these needs for information handling capacity and accuracy, accountants were among the first to turn to computers and data processing methods for assistance in solving their problems. And, in response to the requests of the accounting community, the computer and data processing industry has provided a continuing evolution of hardware and software products to meet accountants' needs. Historically, computer systems initially proposed to handle the demands of accounting applications featured complex, centralized facilities owned or leased by the user. These facilities included numerous key-punch operators and associated equipment for coding financial records onto cards that were subsequently batch processed by large, mainframe computers.

However, in time, large, centralized key-punch and batch processing operations became excessively costly to operate and were found prone to error. Specifically, the expense of owning or leasing the centralized computer resources necessary for handling accounting applications became prohibitive and the disassociation of the key-punch personnel from the record-originating site led to errors and delay in coding. Accordingly, to reduce costs and improve accuracy, accountants shifted from centralized systems to more cost effective distributed systems that featured use of remote terminals coupled to a large, time-shared host computer. With the distributed processing approach costs are reduced since computing resources are paid for only as used, and accuracy is improved by locating the data-entry points closer to the record-originating sites.

In such systems, accounting records are typically supplied; i.e., uploaded, from the terminal to the host databases by means of interactive screens the host presents to the user terminal once the terminal is logged onto the system. The interactive screens commonly contain fixed forms that query the terminal operator for entry of the accounting data at designated fields on the screens. In this arrangement, host and terminal operation is facilitated by software resident at the host and terminal that constitutes an accounting system having one or more modules such as a general ledger, accounts receivable, accounts payable, inventory and fixed assets. The various modules are coordinated through a series of related databases resident at the host that are periodically updated with accounting data uploaded from the terminal. An example of such a software accounting package is the Millennium ® System offered by Dun & Bradstreet Software Services, Inc.

The interactive-screen approach of such systems was originally proposed to improve accuracy. It was felt that by carefully guiding the operator through the data-entry process with screen prompts and messages, errors could be avoided and, accordingly, operating costs reduced. Regrettably, however, problems have been experienced. While screen prompts can be helpful, it has been found that accuracy is adversely affected by requiring operators to transcribe data from prepared entry forms to the interactive screens. Specifically, operators tend to make errors in transferring data from the entry forms, which are commonly handwritten, to the numerous field spaces of the interactive screens. Further, in addition to the tendency for error, operator entry of the data from the forms to the screen fields is time-consuming, thus aggravating operating costs.

While Dun & Bradstreet Software Services, Inc. has offered companion software entitled PC Link ® that includes batching procedures to improve the data uploading efficiency of its Millennium System, still time and accuracy difficulties remain. Specifically, though the PC Link software enables spreadsheet files containing accounting data to be uploaded to the Millennium host databases without need for operator entry of each data record to an interactive-screen field, the PC Link procedures require creation of special formatting files, manual designation of field fill and restrictions on the spreadsheet input files, all of which serve to restrict the speed and accuracy with which data can be uploaded.

SUMMARY OF INVENTION

Accordingly, it is an object of this invention to improve the accuracy of data uploading for interactive-screen accounting systems.

It is an another object of this invention to improve the speed of data uploading for interactive-screen accounting systems.

It is yet a further object of this invention to improve the accuracy and speed of data uploading for interactive-screen accounting systems with simplified and readily applied procedures.

It is a still further objective of this invention to improve the efficiency and reduce the cost of data uploading with interactive-screen, accounting systems.

Briefly, the method of this invention achieves the above and other objects by using a management program having a series of instructions that direct an interface program to selectively load accounting data specially formatted with spreadsheet software to the interactive screens of an accounting system program.

More specifically, the method of this invention features use of spreadsheet software to specially format accumulated accounting records such as debits and credits in digital files. In accordance with the method, records representing accounting transactions are collected and predetermined information that characterizes the record; for example, the amount, whether it is a debit or credit, the charged account, vendor, etc., are loaded to the cells of a spreadsheet. The information for each record is laid out in single-row, multiple-column form so that the spreadsheet files may be used to create vivid, hard copy journals that memorialize the accounting transactions. Additionally, in accordance with the method, the spreadsheet data layout may be transformed and supplemented to create digital files containing the accounting data of each record in single-column, multiple-row form specially suited for selective placement in screen fields of an interactive-screen accounting program.

Additionally, the method of this invention features use of a management program that includes instructions for directing the coordination and feeding of the accounting data contained in the spreadsheet files to an interface program that loads the data to the fields of the accounting systems interactive screens. The management program's instructions cooperate with the single-column, multiple-row format of the spreadsheet file that indexes the data, and the interface program such that the data can be loaded to the interactive-screen fields while the screens follow their usual sequence under control of host software.

DESCRIPTION OF THE DRAWINGS

The above and further features and advantages of the method in accordance with this invention will become clear from the following, more detailed description read with reference to the accompanying drawings in which:

FIG. 2 is an illustration of several debit and credit records to be uploaded to the interactive-screen accounting system in accordance with the method of the invention.

FIG. 3 is a schematic representation of a spreadsheet in which accounting records have been entered in accordance with the method of the invention.

FIG. 4 is an illustration of the hard copy form for the accounting data to be uploaded in accordance with the method of the invention.

FIG. 5 is a listing of the specially formatted and supplemented accounting data to be uploaded as contained in the spreadsheet digital file in accordance with the method of the invention.

FIGS. 8 and 9 are schematic representations of the first interactive screen of the accounting system for the upload sequence before and after data has been entered in accordance with the method of the invention.

FIGS. 10 and 11 are schematic representations of the second interactive screen of the accounting system for the upload sequence before and after data has been entered in accordance with the method of the invention.

FIGS. 12 and 13 are schematic representations of the third interactive screen of the accounting system for the upload sequence before and after data has been entered in accordance with the method of the invention.

FIG. 14 is a schematic representation of the fourth interactive screen of the accounting system for the upload sequence after data has been entered in accordance with the method of this invention.

FIG. 16 is a listing of instructions included in the management program in accordance with the method of the invention for directing entry of the accounting data to the interactive screens of the accounting system program.

DESCRIPTION OF THE PREFERRED EMBODIMENT

Figure 1:
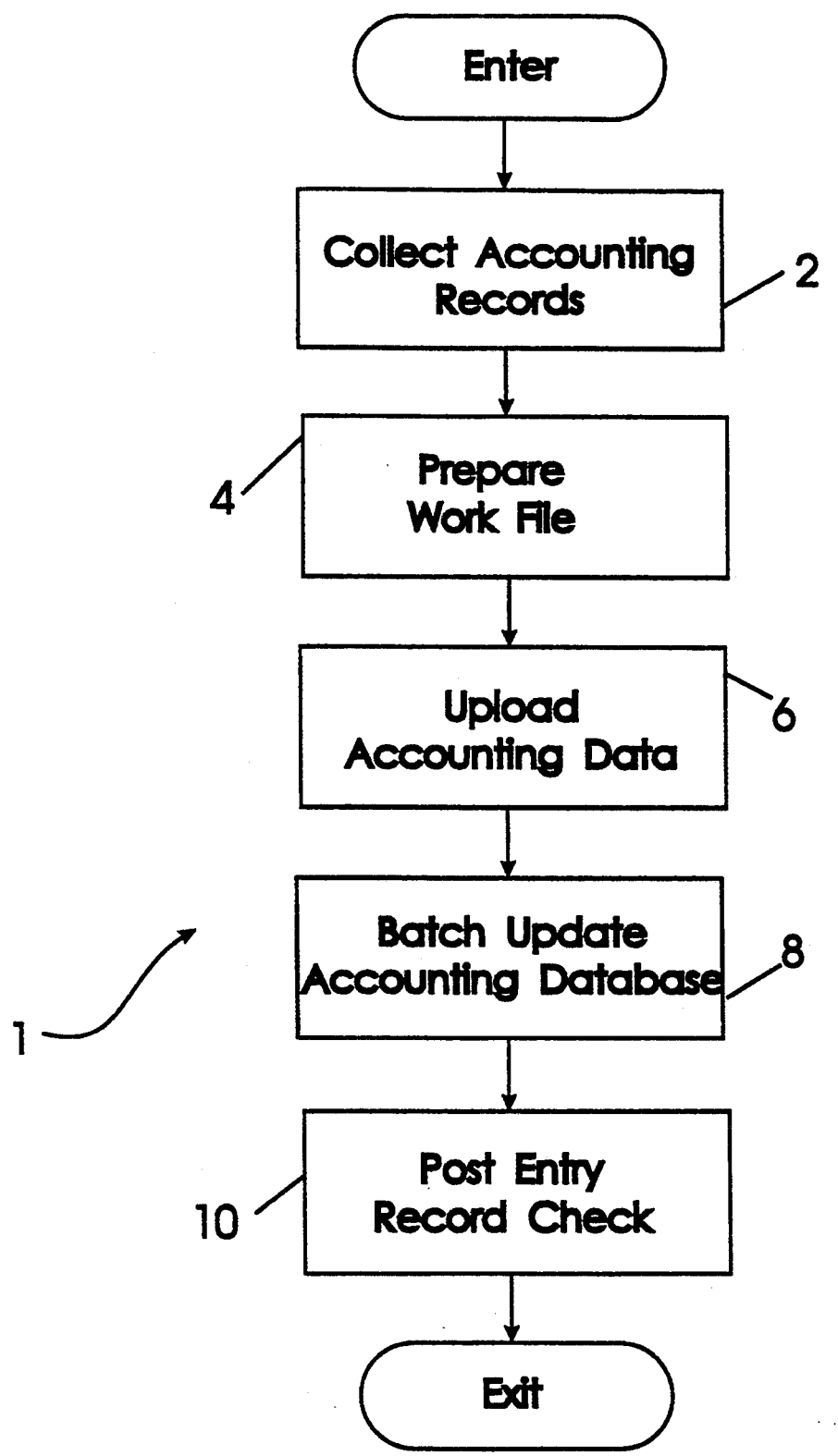
FIG. 1 is a flow diagram showing the major steps of the improved, interactive-screen, data uploading method in accordance with the invention.

As noted above, the financial, commercial and governmental requirements of contemporary society have precipitated an ever increasing demand for accounting data. In addition to the volume that must be handled, the nature and use of the data created is such that it compels strict accuracy. Accounting transactions are ultimately "net-sum" in character. Accordingly, any error in their handling, must cost someone money. For these reasons, accountants have come to rely on computers and data processing methods to assist and assure their work.

In this regard, it has become popular for accountants to use distributed data processing systems that feature terminal computers located at or near accounting data originating sites to upload information to a host computer where the information may be maintained and utilized to drive the accounting function. Further, in such systems, it is common for the host to support a series of interactive screens at the terminal to assist accounting personnel in uploading the required data. Screen prompts and fixed fields for data entry are intended to aid the operator in accurately entering the accounting information for upload to the host. An example of such a facility is the Millennium ® System offered by Dun & Bradstreet Software Services, Inc.

However, while interactive-screen accounting systems are intended to foster data entry accuracy, errors do arise. Since such systems call for operators to make data entries at terminals, errors can occur as a result of operator mistakes in transferring data from entry forms, which are commonly handwritten, to the numerous field spaces included in the interactive screens. As will be appreciated, where the number of errors increases, the need for error checking and correction also increases, and with it, the cost of operation, a commercially undesirable condition. Further, in addition to the tendency for error, operator entry of data from forms to screen fields tends to be time consuming, thus again increasing operating costs.

To address some of the shortcomings of operator screen entry, Dun & Bradstreet Software Services, Inc. has offered a software application titled PC Link ® that permits batch uploading; i.e., uploading that does not require operator participation for entry of each data record to the system interactive screens. However, as described in the user guide for version 3.0 of the software, published in 1988, uploading of data in accordance with the guide's teaching requires the user to create an Upload Definition File (UDF), the prescribed creation process for which is awkward to undertake and cumbersome to use. Specifically, the UDF creation process entails formulating a field-fill map by accessing the interactive screen to which data is to be loaded, and specifically associating the fields that are to receive data with the type of data the selected fields are to receive as identified in a model data file. Yet additionally, while the described uploading process contemplates use of spreadsheet files, the spreadsheet files are restricted to so called "fixed length format"; i.e., files in which multiple data columns are located at fixed points from row to row of the multiple-column, multiple-row data array, such as would be provided with a conventional Lotus 1-2-3 ® file where margins have been omitted.

In accordance with an aspect of the preferred form of the method of my invention, however, I have found I am able to improve upon the procedures described for version 3.0 of the PC Link software and undertake data uploading simply and without need for creation of an Upload Definition File and its associated difficulty. More specifically, I have found that by formatting the data file in a prescribed fashion prior to uploading, and by directing the feeding of the data file to the PC Link program with a management program written in PC Link script, I can direct PC Link's execution of the upload sequence smoothly and efficiently. And, as compared with the time required to upload records using conventional interactive-screen techniques, I find a substantial reduction in the time required to carry out the uploading process. For example, while it was found to take approximately 45 minutes to manually key in 100 records using conventional interactive-screen procedures, it was found to take approximately 1.5 minutes to upload the same 100 records using my method.

The method of my invention for improving interactive-screen data uploading is shown in its broad aspect in FIG. 1. As seen in FIG. 1, the method 1 broadly includes steps for collecting the accounting records to be uploaded (2); preparing a spreadsheet work file based on the collected accounting records (4); uploading the records to the host computer (6); updating the accounting system databases with the uploaded records (8); and checking the updated databases for correctness (10).

More specifically, the initial step of my method; i.e., the step designated 2, calls for collection of the records to be uploaded to the accounting system. For the purposes of description, the records and accounting system to be updated are presumed to be those of a company that maintains computer terminals tied to a host computer that supports the Millennium Accounting System or an equivalent interactive-screen accounting facility. Further, the records updated are presumed to be for entry in the system's general ledger module. In this regard, the records to be collected are of conventional type, and as will be appreciated by those skilled in the art, might include the recording of a series of invoices submitted to the company for services rendered, and payment of those invoices by the company.

By way of illustration, four such records are depicted in FIG. 2. As shown, the first record is an invoice 12, submitted Oct. 10, 1991, by an attorney, Charles P. Thompson, in the amount of $850.00 for professional services rendered Oct. 3, 1991. The second record is a company check 14 dated Oct. 15, 1991, in the amount of $850.00 made payable to Mr. Thompson for the services rendered Oct. 3, 1991. The third record is an invoice 16 submitted Oct. 11, 1991 by an accountant, Robert D. Mellon, in the amount of $975.00 for professional services rendered Oct. 4, 1991. And, the fourth record is a company check 18 dated Oct. 15, 1991 in the amount of $975.00 made payable to Mr. Mellon for the services rendered to the company Oct. 4, 1991. As will be appreciated by those skilled in the art, the collection process is conventional and comprises the usual accounting procedures for bringing such records to an accounting site for processing.

Continuing, following collection of the accounting records, method 1 calls for preparation of a record work file; i.e., the step designated 4 in FIG. 1., that will enable the subsequent record uploading procedure. In accordance with the invention, the work file is prepared by entering the accounting information into an electronic spreadsheet. I employ the electronic spreadsheet because I have found a number of advantages arise from its use. First, by entering the records to a spreadsheet, the human process of transferring information from physical records 12 to 18, can be checked and errors corrected before the information is loaded to the system; i.e., the terminal, host and host databases. As noted above, errors that are entered to the system are costly to correct since they require interrogation of the host databases, identification of the mistakes there contained, and entry of corrections.

On the other hand, by first loading the accounting information from the physical records to electronic form in the spreadsheet, mistakes introduced by human error can be found and corrected before the information is entered in the system. As will be appreciated, once the records are in electronic form, human error associated with information transfer is no longer a factor. It is also to be noted that this benefit is in addition to the time saving realized by batch uploading the records; i.e., the benefit realized by eliminating the need for an operator to undertake entry of individual records to the system interactive screens.

Additionally, a further advantage of the spreadsheet is the ability to use the spreadsheet calculating facility to aid error detection. For example, running totals can be easily maintained for debit and credit entries made at the spreadsheet. Because the total debits must equal total credits, a convenient "control total", as is commonly employed in accounting procedures, can be developed. If at any point debits do not equal credits, the absence of equality indicates an error has occurred in the entry process. As is well understood in the accounting community, however, equality of debits and credit is not a guarantee of error absence.

Yet additionally, another advantage of spreadsheet use is that hard copy printouts of the accounting records that permit a visual inspection of the information can be easily produced. As will be appreciated, a visual inspection of properly drawn accounting entries enables detection of errors and facilitates their correction. Still further, the hard copy of the records constitutes an audit trail for the accounting records that memorializes their processing. In preferred form, the electronic spreadsheet software I use is Lotus 1-2-3, version 2.2, offered by the Lotus Development Corporation. However, as will be appreciated by those skilled in the art, spreadsheet software comparable to Lotus 1-2-3 version 2.2 could also be used.

Entry of physical records 12 to 18 to an electronic spreadsheet is illustrated in FIG. 3. As shown, spreadsheet 20 includes a plurality of columns 22 designated A to Q, and a plurality of rows 24 designated 1 to 315 to constitute a multi-column, multi-row array of cells designated generally as 26. In conventional fashion, spreadsheet cell array 26 is divided into a header portion 28, including rows 1 through 10 and columns A to Q; and a record portion 30 comprising rows 11 to 315 and columns A to Q. Further, in keeping with conventional spreadsheet layout, the cells to the right of column Q are reserved for entry of any spreadsheet macros that may be used to expedite spreadsheet manipulation.

As noted above, an advantage of spreadsheet use is the ability to readily fashion a design for hard copy printout that provides clear documentation of the records entered. This applies both to use of the hard copy as a convenient means for visually detecting entry errors and its function as an audit trail. In that regard I have laid out spreadsheet header region 28 to quickly reflect the nature of the information entered. As in conventional spreadsheet formulation, the header information is entered without regard to cell size and includes a variety of items to designate the records for upload. Specifically, "Accounting Date" designates the closing date for the accounting period covered, and in the illustration given covers the period ending Oct. 31, 1991. Continuing, "Journal Entry Type" identifies the nature of the accounting entries as accrued or current, and in the illustration given, indicates the records are current. "Prepared By" designates the person who prepared the entries. "Journal Number" designates the identification number for the current listing of records, here given as "EA001." "Approved By" identifies the supervisory person who reviewed the journal following its creation and found it acceptable for entry in the accounting system. "Date Prepared" gives the date of the journal's preparation, here designated as Nov. 15, 1991. "Entered By" indicates the person who actually uploaded the journal of records to the host, shown as Nov. 15, 1991. "Date Entered" designates the date of upload. "Control Total" designates the sum of the debits of record entries and, also, the sum of the credits, and for the records given, is $1,825.00; i.e., $850.00 plus $975.00. As noted, the control total is a potential indicator of error, and is computed by the spreadsheet following entry of the records. "Header" designates the nature of the accounting records being processed and in the illustrative example represents cash adjustments.

As will be appreciated, Accounting Date; Journal Entry Type; Prepared By; Journal Number; Date Prepared; and Header are entered before entry of the record information. The Control Total, however, would be supplied following entry of the records at spreadsheet region 30. In this regard, it is to be noted that on direction from the operator, the spreadsheet program will sum debits and sum credits. If the debit sum and credit sum are equal, a control total which represents the debit sum and the credit sum can be entered to the spreadsheet header. However, if the credit sum and the debit sum are not equal, the operator is thereby advised an error exists, and can pursue its correction. In the preferred form of the method, this procedure has been reduced to a macro using conventional electronic spreadsheet techniques to aid the spreadsheet preparer. Since these techniques would be familiar to those skilled in the art, they will not be further discussed here. If additional information is desired, reference may be made to the Lotus 1-2-3 version 2.2 user manual which is incorporated herein by reference.

Following the preparer's satisfaction with the spreadsheet, a hard copy printout can be produced for approval review. Following approval, the Approved By; Entered By and Date Entered information can be entered to the spreadsheet header, and the spreadsheet used to create the required upload work file.

With regard to the format used to enter record data to the spreadsheet, in accordance with the method, I have specifically set each record entry to comprise a plurality of columns and a single row. This format enables each record to be entered so that it presents a clear display when the spreadsheet is printed as a hard copy. Further, this format also allows each record to be transformed to a single column and multiple rows using conventional spreadsheet manipulation techniques for efficient management in the record upload process to be discussed more fully hereafter.

Regarding the layout of the record columns, I have selected the number of columns to accommodate the information necessary to adequately characterize the record in accordance with the requirements of the interactive screen used by the host accounting system software. Specifically, "Acct #" designates a line item code that indicates the nature of the item; e.g., legal services, etc. "CTR" designates the cost center with respect to which the accounting is taking place; e.g., a project or department number. "D/C" identifies whether the item is a debit or a credit "Amount" as implied identifies the dollar amount of the item. "S/I" designates a subledger identification number that specifies the ledger where the vendor number is located, the vendor number representing the entity who has had an accountable transaction with the company. "Ven #" designates the vendor identification number, which as noted, designates the entity; e.g., person or other corporation, etc. that has had an accountable transaction that is to be recorded. "Description" is an open comment field that permits remarks to be entered. In the illustration provided, "Cash Adj" stands for cash adjustment and represents a simple payment for services rendered. "Alt Description" is an additional comments field and permits further comment for the activity. In the illustration given, the name of the vendor is provided.

As shown in FIG. 3, in addition to the record information cells, I have also included boundary cells to permit each of the information items to be set apart to enhance legibility of the entry. In preferred form, I fill each boundary cell with a bar to further improve separability of the information items in the hard copy print out. Therefore, in preferred form, to allow for the arrangement of information and boundary cells prescribed, I set out seventeen columns for each record. As will be appreciated by those skilled in the art, the cell width for each of the columns is variable and can be readily adjusted to accommodate the information and boundary items desired.

Regarding the number of rows for the spreadsheet, since I transform the single-row, multiple-column record format to multiple-rows, single-column format, following entry of records to the spreadsheet, I limit the number of records entered per spreadsheet journal to not more than 315. This is done so as not to exceed spreadsheet capacity when the transformation is undertaken. As noted, the formatting of the spreadsheet in the fashion described, produces a clear and distinctive hard copy of the journal and its records upon printing. An illustration of the hard copy printout for the spreadsheet shown in FIG. 3 is presented in FIG. 4 as journal 32.

In accordance with method 1, once record entry to spreadsheet 20 has been completed and approved, the work file for use in the uploading process is generated. To produce the work file, spreadsheet 20 as shown in FIG. 3 is transformed and its information supplemented with predetermined fixed information relating to the uploading process using conventional spreadsheet manipulation techniques. Specifically, the work file is generated as a spreadsheet print file; i.e., "PRN" file. A listing of the PRN file is shown in FIG. 5. With reference to FIG. 5, PRN file listing 34 is seen to include a sequential array of line elements, each line element being identified with a line number presented to the left of the respective line. As shown, beginning at line 14, the listing corresponds to the sequence of columns for successive record rows of spreadsheet 20. As will be appreciated, the sequential array of line elements results from the above noted transformation of the single-row, multiple-column record cell array to a single-column, multiple-row array. This transformation is undertaken to format the spreadsheet record data so that each information element; e.g., account number, center number, etc., occupies a single line of the PRN file. The configuration of the PRN file in this fashion enables a script to be prepared using, in preferred form, the PC Link script language as described in the PC Link User Guide for version 3.0 of the software, published in 1988, the contents of which are incorporated herein by reference, that is capable of directing placement of the PRN line elements at prescribed field location of the Millennium interactive screens using an interface program, which in preferred form is the PC Link program.

With regard to lines 1 to 13 of PRN file listing 34, the information there contained arises from selected placement of spreadsheet header 28 information and a collection of predetermined information elements relating to the uploading process which are introduced when spreadsheet 20 is transformed to generate the PRN file. More specifically, "I" at line 1 of listing 34 represents a data insert and is supplied as a predetermined information element. "ED" at line 2 represents an edit and is also supplied as a predetermined information element. "EA001" represents the identification of the upload journal and is supplied from the spreadsheet header. "Cash Adj" identifies the nature of the journal transactions and is supplied from the spreadsheet header. "$$" represents that the journal entry amounts are in dollars and is provided as a predetermined information element. "C" represents that the journal entry type is current as opposed to accrued, and is supplied form the spreadsheet header. "Oct. 31, 1991" represents the accounting period end date, and is provided from the spreadsheet header. "A" represents that erroneous records can be accepted in the accounting system as suspense items, and is provided as a fixed information parameter. "MR" identifies the person who entered the information, and is supplied from the spreadsheet header. "G" indicates that the debit and credit amounts are gross amounts, and is supplied as a predetermined information element. "1,825.00" represents the control total, and is supplied from the spreadsheet header. "D" designates that records entered can be deleted and is supplied as a predetermined information element. And, "10" designates the line separation between record entries, and is supplied as a predetermined information element.

The particular placement of the spreadsheet header information, predetermined information elements and record information in the PRN file listing in accordance with my invention is dictated by the plan of data fill to be undertaken at the interactive screens. My method recognizes that the Millennium System interactive screen sequence dictates the flow of screen fields to be filled and, accordingly, I arrange the PRN file listing to provide the sequence of data required. Further, my method also recognizes that the scripting facility of the PC Link program is capable of reading successive lines of a data source file. Accordingly, I have arranged the PRN file data on successive lines as shown in FIG. 5, so that the upload management script can successively "deal" the indexed PRN file data to the sequence of interactive screens supplied at the uploading terminal by the Millennium software.

The point of the above discussion will be better understood after consideration of the next step of my method; i.e., the upload of accounting data, designated step 6 in FIG. 1. As noted, I have found that where the record data is properly formatted; i.e., arranged as successive lines in a single column, it can be quickly and efficiently uploaded to the host if a management program is used to oversee and direct operation of an interface program that handles insertion of the data to the host interactive screens. As will be appreciated, while in preferred form the interface program is PC Link, version 3.0, a comparable interface program capable of supporting data input to the host system interactive screens could also be used. Where a program other than PC Link is used, however, the management program would be written so as to be compatible with it.

Continuing, as noted, in preferred form, the interface program is PC Link. Accordingly, the managing program is written in PC Link script language. As a result, with appropriate selection of the PC Link script "keywords"; i.e., verbs, the successive interactive screens of the Millennium data upload sequence may be controlled and the data of the PRN file selectively introduced to the screen fields. Specifically, by using the PC Link script keyword which places designated keystrokes at prescribed screen position; e.g., "Say" and "Put", the management program is able to control the generation and dispatch of the host interactive screens as if the keystrokes had been entered by an operator from the keyboard in conventional interactive-screen fashion. Further, by using the PC Link keyword that accepts data from a designated open file and places it in a specified screen field; i.e., "Read", the management program is able to distribute select data; e.g., record data, to the interactive screens as the interactive screen progression goes forward. In this regard, since the PC Link Read keyword operates on the "current" line of the data file; i.e., the line the PC Link has progressed to in the course of accepting information from the data file, the information file; i.e., the PRN file, is required to be organized as a succession of lines of data, each line containing a single information element.

Figure 6:
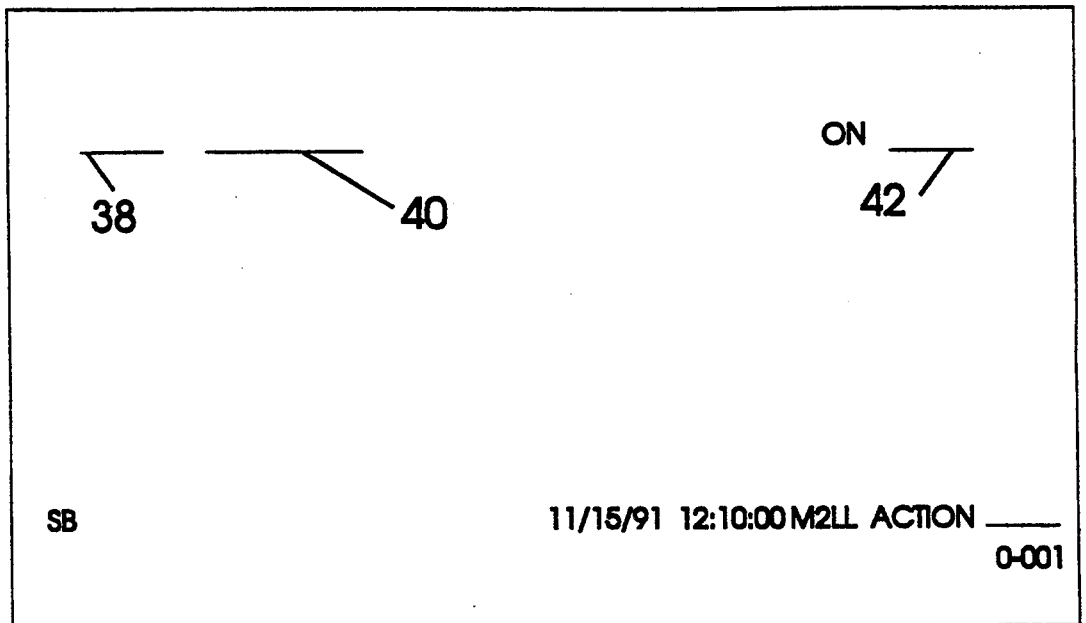
FIGS. 6 and 7 are schematic representations of the interactive screen that initiates the data uploading screen sequence of the accounting system before and after data has been entered in accordance with the method of the invention.
Figure 7:
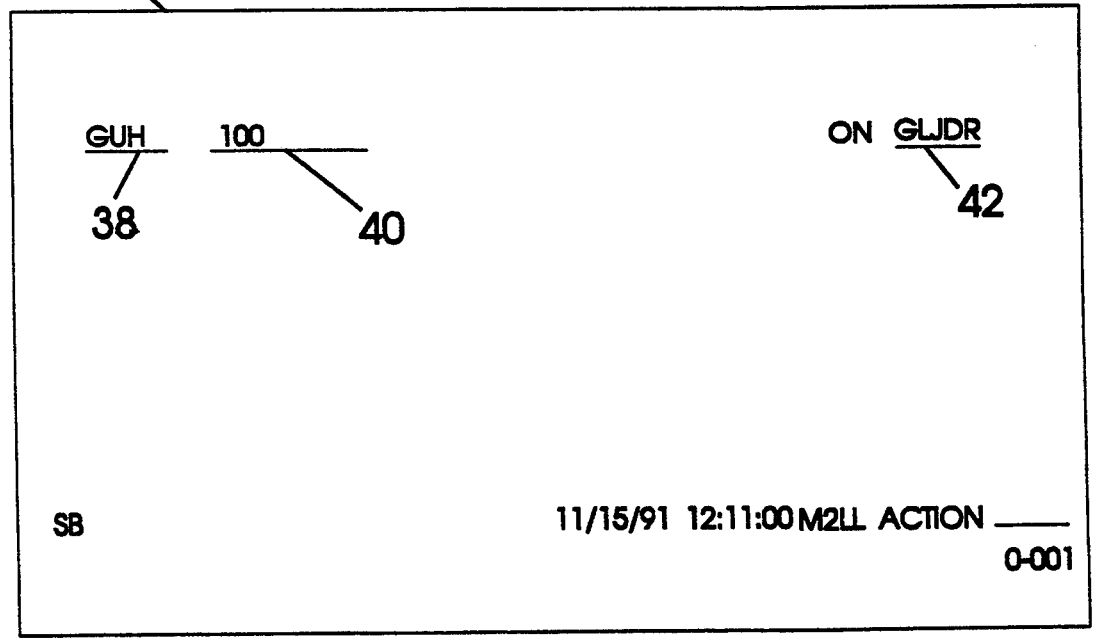

A discussion of the interactive screen sequence and operation of host software will help to further illustrate the described relationship between the management program, PRN file, interface program and the interactive screens. In accordance with the operation of the host accounting system, all system screen navigation originates from an initiation screen 36 shown in FIG. 6. Following sign-on to the host accounting system, the terminal must designate three pieces of information to proceed: the action to be pursued, the identity of the entity whose database records are to be accessed and the screen sequence desired. This information would be loaded to the first three fields designated 38, 40 and 42 of screen 36 shown in FIG. 6. In the case of data uploading to the general ledger, the procedure under consideration here, the required field fills as shown in FIG. 7 would be: "GUH" in field 38, which represents "get for update and hold"; "100" in field 40 which identifies the company whose accounting records are to be accessed; and "GLJDR" in field 42 which calls for the "General Ledger Journal Directory."

Figures 8, 9:
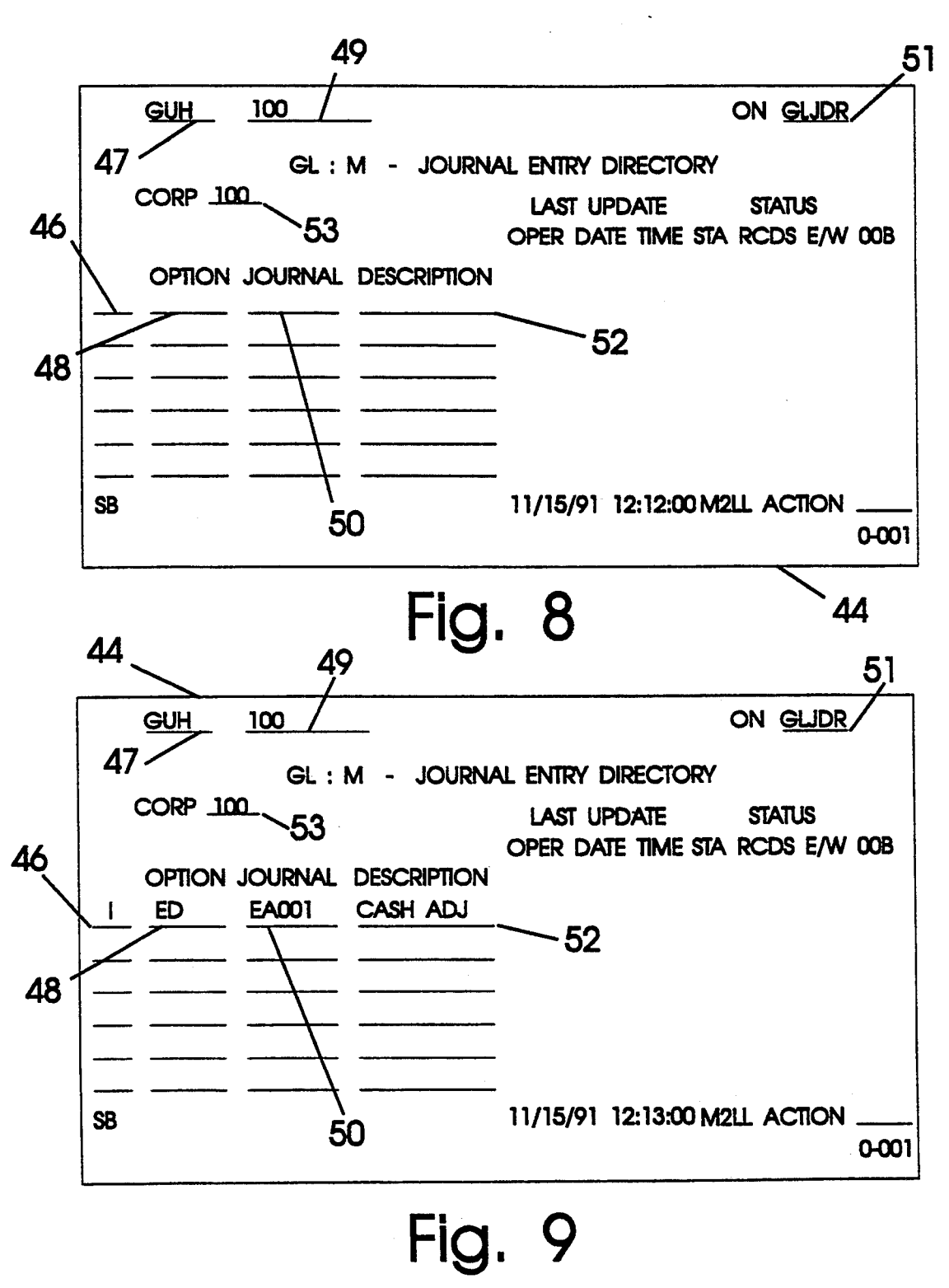

In response to entry of the information at the respective fields, the host accounting system would bring up journal entry directory screen 44 shown in FIG. 8. At presentation of screen 44, the initiation information of screen 36 as shown in FIG. 7 is present as part of the screen 44 header. Following presentation of screen 44, the terminal would supply the information necessary to identify and describe the journal to which record data will be supplied by entering suitable information in fields 46 to 52 respectively. For the illustration of the present example, as shown in FIG. 9, that information would include: "I" at field 46 to designate record insertion; "ED" at field 48 to designate record edit; "EA001" at field 50 to identify the journal number; and "CASH ADJ" at field 52 to describe the nature of Journal EA001.

Thereafter, the host system would navigate the terminal to the Journal Entry Header screen 54 shown in FIG. 10. Once again, the appropriate header information for screen 54 is carried forward from the proceeding screen, and the terminal is given the opportunity to enter information in screen fields 56 to 74. As seen in FIG. 11 that information includes: "CASH ADJ" at field 56 to designate the journal type; "$" at field 58 to designate real value of the entry; "C" at field 60 to indicate the amount is current as opposed to accrued; "Oct. 31, 1991" at field 62 to indicate the end of the accounting period; "A" at field 64 to indicate erroneous records are to be captured in a suspense account; "MR" at field 66 to provide the initials of the journal preparer; "G" at field 68 to designate that debits and credits are gross; "1,825.00" at field 70 to represent the control total; "D" at 72 to indicate the record is deletable; and "10" at field 74 to identify the spacing between record entries.

And, once again, following insertion of the required information, the host would navigate the terminal to the next screen in the sequence, the Journal Entry Detail Screen 76 depicted in FIG. 12. As shown in FIG. 12, header information supplied by prior screen, in this case, the header screen itself, is once more automatically provided. At this point, the terminal can respond by entering the specific data in fields 78 to 98 for the records to be supplied as shown in FIG. 13.

Figure 15:
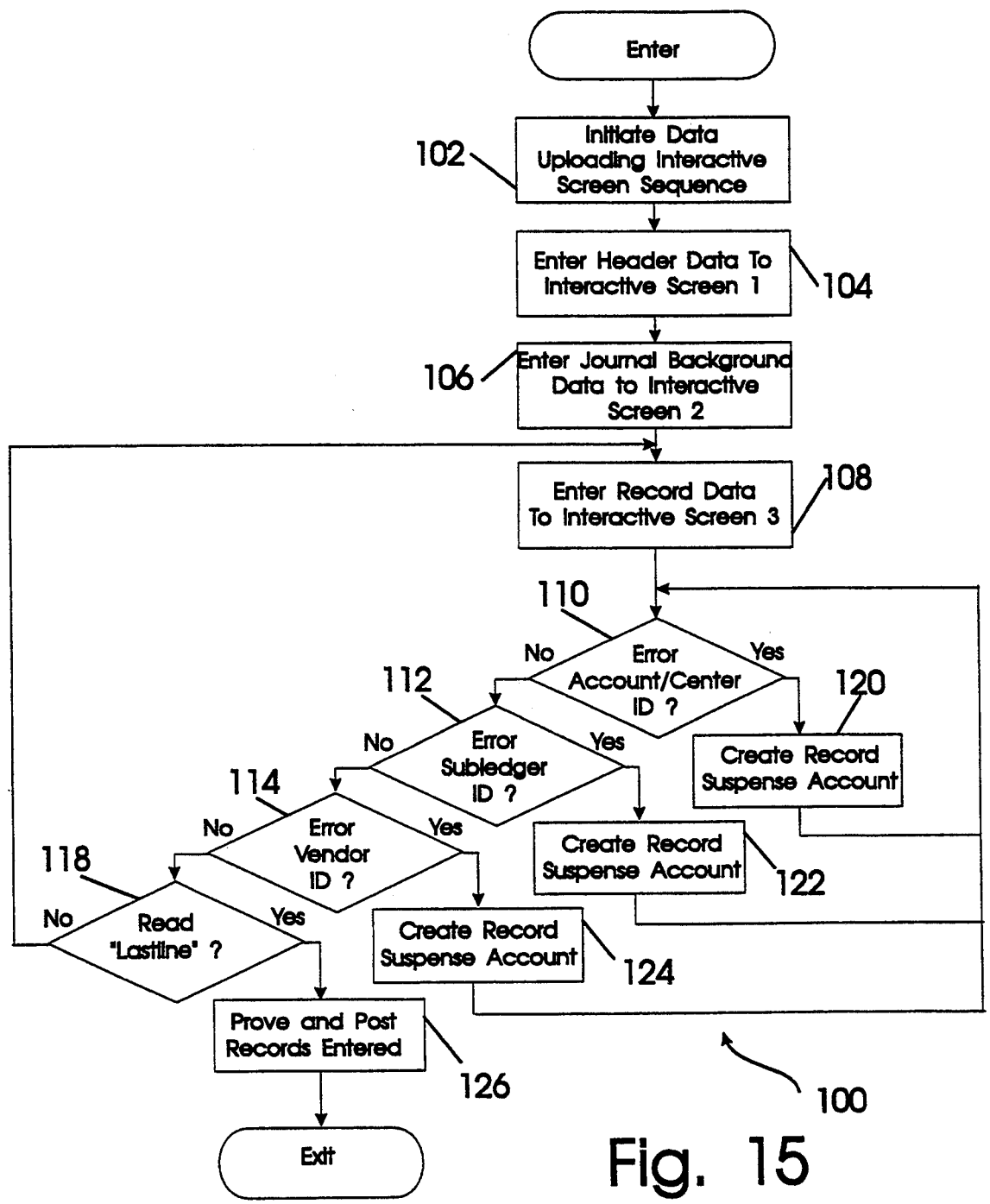
FIG. 15 is a flow diagram of the managing program in accordance with the method of this invention for directing entry of the accounting data to the interactive screens of the accounting system program.

Given the description of the successive record data uploading screens, it will be appreciated that a prescribed stream of information is required to support the screen sequence flow. In accordance with my invention, that stream of information is provided by the PRN file described above and the management program. With regard to the management program, FIG. 15 provides a general description of the program flow. More specifically, as seen in FIG. 15, following entry of the management program designated 100; as for example in preferred form where an operator has signed on to the host, loaded the PRN file to the terminal disk drive, activated PC Link program and invoked the management program 100, operating block 102 proceeds to open the PRN file and begin the host screen navigation by loading data to the sequence initiation screen shown in FIGS. 6 and 7. Thereafter, as designated by operation block 104, the program next processes screen 44 of FIGS. 8 and 9, and then, proceeds to operation block 106 that satisfies screen 54 of FIGS. 10 and 11, before proceeding to operation block 108 where the first data record is entered. Following entry of the first data record, program 100 proceeds through a cascade of error checks to determine whether the record has been labeled as containing an error by the host system for either a defective account or center identification number (110), or a defective subledger identification number (112) or a defective vendor identification number (114). In the case where an error is detected; where the host has entered an error message on the interactive screen, program 100 first creates a suitable suspense account at operation blocks 120 to 124, respectively, and returns to the error check cascade to again look for any of the noted error messages.

As will be appreciated, by detecting and directing records the system has indicated are erroneous to suitable suspension accounts with program blocks 110 to 114 and 120 to 124, respectively, my method can segregate potentially problem material before it is entered to the system databases. As will be described more fully below, actual update of the system accounting databases is not undertaken until some time after completion of the data uploading steps. This feature has significant value because it permits records containing errors to be conveniently collected in suspense accounts, investigated and corrected before the uploaded records are entered to the system databases where correction, as noted above, becomes more time consuming and expensive.

Returning to consideration of program 100, where no errors are detected at screen 76 following entry of the record, program 100 moves from the successive error checks as shown and passes to a decision block 118 where a determination is made as to whether further records exist to be uploaded. As shown, the condition which controls the decision is whether the program 100 has stepped the PRN file through to its "Lastline." Where the PRN file has not reached the end of records to be entered, program flow loops back to operation block 108 where another record may be read in. Once program 100 has exhausted the PRN file record cache and reached the "Lastline" statement, thereby positively answering the query at block 118, program 100 moves to a record prove entry operation block 126, by entering a "PR" in field 116 of screen 76. Once this occurs, the host navigates the terminal to the prove screen 128 shown in FIG. 14. Following display of prove screen 128, the host navigates the terminal to quit the sequence and releases the terminal thus ending the data entry portion of the upload step.

In accordance with the preferred form of my method, once the data entry portion of the uploading phase is completed, a review of any error suspense accounts created in the course of data entry can be undertaken. As will be appreciated, this may be simply accomplished by calling forth the suspense accounts for the various error conditions noted above, and determining the nature of the error and effecting a correction. As noted, this procedure serves to limit the amount and associated expense of the corrections required to be made after the uploaded records are entered to the system databases. On completion of suspense account review, the data upload phase of the method is completed.

Following the exit of the upload process, the system at a predetermined later time; e.g., during the evening of the day the record uploads were processed, batch updates the host accounting database records with the uploads as noted in FIG. 1 as designated step 8 of the method. Subsequently, the general method is completed when terminal operator interrogates the host accounting database, as for example, on the day following the updates to determine what if any error records were entered to the system as designated by general method step 10.

In order to provide a more detailed description of the management program operation, a listing of the management program is provided at FIG. 16. Further, a description of the line-by-line operation of the management program with reference to both the PRN file and the interactive screens is provided below. While in FIG. 16 the program listing includes the actual screen field numbering pattern used by the accounting system software in the preferred form of the method; i.e., Millennium System of Dun & Bradstreet Software Services, Inc., for the purposes of explanation, the screen field numbering has been adjusted in the following description to reflect the numbering pattern of the accompanying figures. The detailed description of the management program is as follows:

1. OPEN (A:/EA001.PRN) (R) Opens file EA001.PRN located on drive A of the terminal for reading; "R" designates a carriage return.

2. SAY (@HGUH@F@T100,@F@TGLJDR@E)

Places the cursor at the "home" position of initial information receiving screen 36 (@H, locates the cursor at Field 1 of the initial screen); enters "GUH" at field 38 (GUH stands for "Get For Update and Hold", and directs that the screen subsequently identified be accessed and held for data entry); erases to end of field 38 (@F); tabs to the next field; i.e., field 40 (@T); enters "100," at field 40 (100 is the Code that identifies the company whose accounting system databases are to be manipulated); erases to end of field 40 (@F); tabs to the next field; i.e., field 42 (@T); enters "GLJDR" in field 42 (GLJDR stands for General Ledger Journal Entry Directory, and identifies the first screen in the sequence of screens used to make a general ledger journal entry with the host software; i.e., the General Ledger Module of the Millennium Accounting System Software); enters a carriage return (@E); dispatches initial screen 36 and calls up GLJDR screen 44 of FIG. 8; with its first four fields filled; i.e., field 47 takes GUH; field 49 takes 100; field 51 takes GLJDR and field 53 takes 100.

3. READ (5)

Reads the current line (ln 1) of the open file (EA001.PRN); writes its contents ("I" indicates data insert) to field 46 of screen 44; and moves to the next line of the PRN file.

4. READ (6)

Reads the current line (ln 2) of the open file (EA001.PRN); writes its contents ("ED" indicates edit) to field 48 of screen 44; and moves to next line of the PRN file.

5. READ (7)

Reads the current line (ln 3) of the open file (EA001.PRN); writes its contents ("EA001" designates the journal to be entered in the host general ledger) to field 50 of screen 44; and moves to the next line of the PRN file.

6. READ (8)

Reads the current line (ln 4) of the open file (EA001.PRN); writes its contents ("CASH ADJ" represents the type of journal entry being made) to field 52 of screen 44; and moves to the next line of the PRN file.

7. SAY (@E@E)

Enters two carriage returns at the cursor location to close screen 44 and brings up the next screen in the journal entry sequence; i.e., screen 54 of FIG. 10 titled General Ledger Journal Entry Header. As screen 54 is brought up, the screen header and field 56 are loaded by default.

8. REDRAW

Displays screen 54 9. READ (2) Reads the current line (ln 5) of the open file (EA001.PRN); writes its contents ("$$" indicates journal entries are in dollar amounts) to field 58 of screen 54; and moves to the next line of the PRN file.

10. READ (3)

Reads the current line (ln 6) of the open file (EA001.PRN); writes its contents ("C" indicates the entry is current as opposed to accrued) to field 60 of screen 54; and moves to next line of the PRN file.

11. READ (4)

Reads the current line (ln 7) of the open file (EA001.PRN); writes its contents ("Oct. 31, 1991" indicates the closing date of the accounting period for the entry) to field 62 of screen 54; and moves to the next line of the PRN file.

12. READ (5)

Reads the current line (ln 8) of the open file (EA001.PRN); writes its contents ("A" indicates the record found in error may be entered can be accepted and are to be posted to a suspense account; an account set up to receive records marked by the system as containing erroneous or non-conforming data) to field 64 of screen 54; and moves to the next line of the PRN file.

13. READ (6)

Reads the current line (ln 9) of the open file (EA001.PRN); writes its contents ("MR" indicates the operator who entered the record) to field 66 of screen 54; and moves to the next line of the PRN file.

14. READ (7)

Reads the current line (ln 10) of the open file (EA001.PRN); writes its contents ("G" indicates debits and credits are gross figures) to field 68 of screen; and moves to the next line of the PRN file.

15. READ (8)

Reads the current line (ln 11) of open file (EA001.PRN); writes its contents ("1,825.00" represents the control total for the journal) to Field 70 of screen 54; and moves to next line of the PRN file.

16. READ (9)

Reads the current line (ln 12) of the open file (EA001.PRN); writes the contents ("D" indicates the record is removable so that the record may be subsequently changed if desired) to field 72 of screen 54; and moves to the next line of the PRN file.

17. READ (10)

Reads the current line (ln 13) of the open file (EA001.PRN); writes its contents ("10" represents a formatting parameter, specifically 10 lines between journal entries) to field 74 of screen 74; and moves to the next line of the PRN file.

18. SAY (@E@E)

Enters two carriage returns at the cursor location to close screen 54 and brings up the next screen in the journal entry sequence; i.e., screen 76 of FIG. 12 titled General Ledger Journal Entry Detail. As screen 76 is brought up, the screen header of is loaded by default.

19. REDRAW

Displays Screen 76

20. :DISTRIBUTION Identifies the Script line "Distribution" as a jump-to point where processing will be directed if a conditional statement provided at line 44 of the script is satisfied.

21. READ (4)

Reads the current line (ln 14) of the open file (EA001.PRN); writes its contents ("11820" identifies the account ID for the journal entry) to field 82 of screen 76; and moves to next line of the PRN file.

22. READ (5)

Reads the current line (ln 15) of the open file (EA001.PRN); writes its contents ("|" represents a column boundary in the PRN file format that was incorporated to render the journal hard copy easy to read. Accordingly, the "|" character occupies a cell of the journal entry work sheet that has been transformed to a line (row) of the PRN file) to Field 84 of screen 76; and moves to next line of the PRN file.

23. READ (5)

Reads the current line (ln 16) of the open file (EA001.PRN); writes its contents ("1111" indicated the cost center ID for the journal entry. This value is used to overwrite the boarder symbol "|" written to field 84 in the prior step. The script must make two writes to the same field to properly entry the journal data to the interactive screen. The first write accommodates the boarder symbol used to render the journal hard copy more readable, and a second write enters the cost center ID for the journal entry; as will be appreciated, if no boundary was used between spreadsheet cells, the "double write" sequence could be suspended.) to field 84 of screen 76; and moves to the next line of the PRN file.

24. READ (6)

Reads the current line (ln 17) of the open file (EA001.PRN); write its contents ("|"—see the remarks at line 23) to field 86 of screen 76; and moves to next line of the PRN file.

25. READ (6)

Reads the current line (ln 18) of the open file (EA001.PRN); writes its contents ("D" indicated the entry is a debit—see also the remarks at line 24) to field 86 of screen 76; and moves to the PRN file next line.

26. READ (7)

Reads the current line (ln 19) of the open file (EA001.PRN); writes its contents ("|"—see the remarks at line 23 ) to field 88 of screen 76; and moves to the PRN file next line.

27. READ (7)

Reads the current line (ln 20) of the open file (EA001.PRN); writes its contents ("850.00" represents the dollar amount of the journal entry—see also the remarks at line 24) to field 88 of screen 76; and moves to the PRN file next line.

28. READ (8)

Reads the current line (ln 21) of the open file (EA001.PRN); write its contents ("|"—see the remarks at line 23) to field 90 of screen 76; and moves to the PRN file next line.

29. READ (8)

Reads the current line (ln 22) of the open file (EA001.PRN); writes its contents ("A" indicates the subledger ID,—see also the remarks at line 24) to field 90 of screen; and moves to the PRN file next line.

30. READ (9)

Read current line (ln 23) of open file (EA001.PRN); write its contents ("|"— see the remarks at line 23) to field 92 of screen 76; and moves to the PRN file next line.

31. READ (9)

Reads the current line (ln 24) of the open file (EA001.PRN); writes its contents ("970074" represents the vendor ID for the journal entry—see also the remarks at line 24) to field 92 of screen 76; and moves to the PRN file next line.

32. READ (11)

Reads the current line (ln 25) of the open file (EA001.PRN); writes its contents ("|"—see the remarks at line 23) to field 96 of screen 76; and moves to the PRN file next line.

33. READ (11)

Reads the current line (ln 26) of the open file (EA001.PRN); writes its contents ("CASH ADJ" indicates the type of journal entry being made and is provided as part of the remarks for the entry—see also the remarks at line 24) to field 96 of screen 76; and moves to the PRN file next line.

34. READ (12)

Reads the current line (ln 27) of the open file (EA001.PRN); writes its contents ("|"—see the remarks at line 23)) to field 98 of screen 76; and moves to the PRN file next line.

35. READ (12)

Reads the current line (ln 28) of the open file (EA001.PRN); writes its contents ("C. P. THOMPSON" represents further description of the journal entry—see also the remarks at line 24) to field 98 of the current screen (Screen 3); and move to the PRN file next line.

36. PUT (2) (I)

Place "I" ("I" indicates the journal entry is an insert of data) in field 78 of screen 76.

37. REDRAW

Display Screen 76

38. :ERROR1

Identifies the script line "ERROR1" as a jump-to point where processing will be directed if any of the conditional statements provided at lines 49, 53 and 57 of the script are satisfied.

39. SAY (@E)

Enters a carriage return at the cursor, to go to next field of screen 76.

40. IMMEDIF (J013F) (22,1) (5) GOTO (ACCOUNT1)

Determines if "J013F" (Account or Cost Center Error Message) appears at row 22 column 1 extending for 5 columns of screen 76; if yes, processing goes to line location :ACCOUNT1 (ln 45); if no, processing goes to the next line of the script.

41. IMMEDIF (J033F) (22,1) (5) GOTO (SLIDA1)

Determines if "J033F" (SUBLEDGER ID ERROR MESSAGE) appears at row 22 column 1 extending for 5 columns of screen 76; if yes, processing goes to line location :SLIDA1 (ln 50); if no, processing go to the next line of the script.

42. IMMEDIF (J032F) (22,1) (5) GOTO (ID1)

Determines if "J032F" (VENDOR ID ERROR MESSAGE) appears at row 22 column 1 extending for 5 columns of screen 76; if yes, processing goes to line location :ID1 (ln 54); if no, processing goes to the next line of the script.

43. IMMEDIF (LASTLINE) (12,10) (8) GOTO (PR)

Determines if "LASTLINE" (END OF DATA MESSAGE) appears at row 12 column 10 extending for 5 columns of screen 76; if yes, processing goes to line location :PR (ln 58); if no, processing goes to the next line of the script.

44. GOTO (DISTRIBUTION)

Takes the program back to line 20, to read another record.

45. :ACCOUNT1

Jump-to location for creation of suspense account to hold record which produced account or cost center error message.

46. PUT (4) (13597)

Places "13597" ("13597" indicates a suspense account ID for an entry the system believes is in error) in field 82 of screen 76.

47. PUT (5) (1111)

Place "1111" ("1111" indicates a suspense cost center for an entry the system believes is in error) in field 84 of screen 76.

48. SAY (@E)

Enters a carriage return at the cursor to end the record.

49. GOTO (ERROR1)

Jump to line location "ERROR1" (ln 38) to conduct error check. 50 :SLIDA1

Jump-to location for creation of suspense account to hold record which produced subledger ID error message.

51. PUT (8) (A)

Place "A" ("A" indicates a subledger suspense account to hold an entry the system believes is in error) in field 90 of screen 76.

52. SAY (@E)

Enter a carriage return at the cursor to end the record.

53. GOTO (ERROR1)

Jump to line location "ERROR1" (ln 38) to conduct error check.

54 :ID1

Jump-to location for creation of suspense account to hold record which produced vendor ID error message.

55. PUT (9) (999998)

Place "999998" ("999998" is a vendor suspense ID for an entry the system believes is in error) in field 92 of screen 76.

56. SAY (@E)

Enter a carriage return at the cursor to end the record.

57. GOTO (ERROR1)

Jump to line location "ERROR1" (ln 38) to conduct error check.

58. :PR

Jump-to location to conduct proof of record.

59. SAY (@K@K@K@K@F@E)

From the current location of the cursor at row 22, column 10, backtab 4 fields; and erase the field.

60. PUT (1) (PR)

Place "PR" ("PR" indicates the entry has been proved and is acceptable) in field 116 of screen 76.

61. SAY (@E@E@E)

Enters three carriage returns at the cursor to conclude the proof and the data entry process.

62. :END

While I have described my method for improving the process of uploading data with interactive screens in the context of an accounting system, it will be appreciated that my method is independent of the nature of the data being uploaded. As will be apparent to those skilled in the art, my method would apply to any system that seeks to upload data form a terminal to a host with the use of interactive screens. In accordance with my method, where data is to be manually entered to an interactive screen, that process can be automated by creating a data-feed file in which each element of data occupies a single line of the file, and by providing a program having instructions capable of inserting predetermined key strokes to specified fields of the interactive screens, and instructions capable of reading successive lines of the data from the data file into screen fields of choice. Still further, my method, as noted, has particular advantage where it is necessary or desirable to also view or retain the data being uploaded in hard copy form.

Finally, as will also be appreciated by those skilled in the art, though I have described my method in its preferred form, changes may be made in the nature, order and arrangements of its steps without departing form the true spirit and scope of the invention.

What I claim is:

1. In a method for uploading data from a terminal computer to a host computer with the use of one or more interactive screens supported at the terminal computer by the host computer, the improvement comprising:
   a. generating source file means including data elements to be uploaded from the terminal computer to the host computer;
   b. formatting the source file means such that the data elements are arranged on individual file lines;
   c. providing uploading program means including instructions for entering data representing prescribed keystrokes to predetermined fields of the interactive screens, the program means further including instructions for reading the source file means so that predetermined source file data elements may be entered to predetermined fields of the interactive screens, the uploading means being operable to facilitate the uploading of data elements from the terminal computer to the host computer.

2. The method of claim 1 wherein the source file means is created with the use of a spreadsheet program means.

3. The method of claim 2 wherein the data elements constitute one or more data records to be uploaded from the terminal computer to the host computer, each data record including a predetermined number of data elements arranged in a single-row, multi-column array with use of the spreadsheet program means.

4. The method of claim 3 wherein the source file formatting includes transforming the single-row, multi-column data element array for the data records to a multi-row, single-column array of data elements with use of the spreadsheet program means.

5. The method of claim 4 wherein predetermined information is combined with record information to be uploaded when the data source file is created.

6. The method of claim 3 wherein the single-row, multi-column array of data elements constituting the one or more data records may be reproduced with the use of the spreadsheet program means to create a hard copy journal means of the data records to be uploaded to the host computer from the terminal computer.

7. The method of claim 1 wherein the uploading program means includes a management program means and an interface program means, the management program means including instructions compatible with the interface program means such that data representing predetermined keystroke identified by the management program means are entered to the interactive screens by the interface program means, the management program further including instructions compatible with the interface program means such that data elements are read from the data source file by the management program means and entered to predetermined fields of the interactive screens by the interface program means.

8. The method of claim 7 wherein the management program means reads successive lines of the data source file as data elements are entered to the interactive screens.

9. The method of claim 8 wherein the management program means includes instructions for determining whether the host computer has found data records sought to be uploaded in error.

10. The method of claim 9 wherein the management program means includes instructions for segregating records sought to be uploaded which the host computer has indicated are in error.

11. In a method for uploading accounting data from a terminal computer to a host computer with the use of one or more interactive screens supported at the terminal computer by the host computer on which an accounting program is running, the improvement comprising:
   a. generating source file means including data elements that constitute accounting records to be uploaded from the terminal computer to the host computer;
   b. formatting the source file means with the use of spreadsheet program means such that the accounting record data elements are arranged on individual file lines;
   c. providing uploading program means including a management program means and a interface program means, the uploading program means including instructions for entering data representing prescribed keystrokes to predetermined fields of the interactive screens, the program means further including instructions for reading the source file means so that predetermined source file data elements may be entered to predetermined fields of the interactive screens, the uploading means being operable to facilitate the uploading of data elements from the terminal computer to the host computer.

12. The method of claim 11 wherein the management program means includes instructions compatible with the interface program means such that data representing predetermined keystrokes identified by the management program means are entered to the interactive screens by the interface program means, the management program further including instructions compatible with the interface program means such that data elements are read from the data source file by the management program means and entered to predetermined fields of the interactive screens by the interface program means.

13. The method of claim 12 wherein the data elements constitute the data records to be uploaded include a predetermined number of data elements arranged in a single-row, multi-column array, and wherein the data source file is generated by transforming the single-row, multi-column data element array for the data records to a multi-row, single-column array of data elements with use of the spreadsheet program means.

14. The method of claim 13 wherein the management program means includes instructions for determining whether the host computer has found accounting data records sought to be uploaded are in error, and wherein the management program means includes instructions for segregating records sought to be uploaded which the host computer has indicated are in error.

15. The method of claim 14 wherein the single-row, multi-column array of data elements constituting the one or more data records to be uploaded may be reproduced with the use of the spreadsheet program means to create a hard copy accounting journal that enables inspection of the records for errors before they are uploaded, and creation of a record audit trail.

* * * * *